(12) United States Patent
Phelan et al.

(10) Patent No.: US 9,195,585 B2
(45) Date of Patent: Nov. 24, 2015

(54) TECHNIQUES FOR ALLOCATING AND SURFACING HOST-SIDE STORAGE CAPACITY TO VIRTUAL MACHINES

(71) Applicant: VMware, Inc., Palo Alto, CA (US)

(72) Inventors: Thomas A. Phelan, San Francisco, CA (US); Mayank Rawat, Sunnyvale, CA (US); Kiran Madnani, Santa Clara, CA (US); Wei Zhang, San Jose, CA (US); Deng Liu, Mountain View, CA (US); Sambasiva Bandarupalli, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 253 days.

(21) Appl. No.: 13/748,247

(22) Filed: Jan. 23, 2013

(65) Prior Publication Data

US 2014/0208000 A1 Jul. 24, 2014

(51) Int. Cl.
*G06F 12/00* (2006.01)
*G06F 12/02* (2006.01)
*G06F 3/06* (2006.01)
*G06F 12/08* (2006.01)
*G06F 9/455* (2006.01)

(52) U.S. Cl.
CPC .......... *G06F 12/0246* (2013.01); *G06F 3/0605* (2013.01); *G06F 3/0631* (2013.01); *G06F 3/0679* (2013.01); *G06F 12/023* (2013.01); *G06F 9/45558* (2013.01); *G06F 12/0842* (2013.01)

(58) Field of Classification Search
CPC ............ G06F 12/0842; G06F 9/45558; G06F 12/023; G06F 12/0246; G06F 3/0631; G06F 3/0605; G06F 3/0679

USPC ............. 711/170, 154, 6, 203, 103, 111, 114, 711/162; 718/1
See application file for complete search history.

(56) References Cited

U.S. PATENT DOCUMENTS

| | | | |
|---|---|---|---|
| 2003/0046503 A1* | 3/2003 | Park ............................. | 711/162 |
| 2006/0155931 A1* | 7/2006 | Birrell et al. ................. | 711/115 |
| 2008/0183953 A1* | 7/2008 | Flynn et al. .................. | 711/103 |
| 2009/0031100 A1* | 1/2009 | Hansen ........................ | 711/171 |
| 2010/0153947 A1 | 6/2010 | Haruma | |
| 2010/0235669 A1* | 9/2010 | Miyamuko ................... | 713/324 |
| 2011/0225342 A1* | 9/2011 | Sharma et al. .................... | 711/6 |
| 2012/0005402 A1* | 1/2012 | Yamamoto et al. .......... | 711/103 |
| 2012/0005673 A1 | 1/2012 | Cervantes et al. | |
| 2012/0084510 A1* | 4/2012 | Kurashige .................... | 711/119 |
| 2012/0102291 A1 | 4/2012 | Cherian et al. | |
| 2012/0311237 A1* | 12/2012 | Park ............................ | 711/103 |
| 2013/0055248 A1* | 2/2013 | Sokolinski et al. ............... | 718/1 |
| 2013/0067186 A1* | 3/2013 | Pronovost et al. ............ | 711/170 |
| 2014/0032850 A1* | 1/2014 | Phelan et al. ................. | 711/135 |
| 2014/0049551 A1* | 2/2014 | Rao et al. ...................... | 345/543 |
| 2014/0068183 A1* | 3/2014 | Joshi et al. ................... | 711/114 |

OTHER PUBLICATIONS

International Search Report and Written Opinion from International Application No. PCT/US2013/066776 mailed Jan. 3, 2014.

* cited by examiner

Primary Examiner — Hong Kim

(57) ABSTRACT

Techniques for surfacing host-side flash storage capacity to a plurality of VMs running on a host system are provided. In one embodiment, the host system creates, for each VM in the plurality of VMs, a flash storage space allocation in a flash storage device that is locally attached to the host system. The host system then causes the flash storage space allocation to be readable and writable by the VM as a virtual flash memory device.

18 Claims, 9 Drawing Sheets

TECHNIQUES FOR ALLOCATING AND SURFACING HOST-SIDE STORAGE CAPACITY TO VIRTUAL MACHINES

BACKGROUND

In virtualized environments, it is becoming increasingly common for host systems that run virtual machines (VMs) to include one or more locally attached (i.e., "host-side") flash storage devices. For example, one type of host-side flash storage device is a solid-state disk (SSD) or PCIe flash card that is installed within the chassis of a host system. Another type of host-side flash storage device is an external flash drive or appliance that is directly connected to a host system via a peripheral interface.

Generally speaking, host-side flash storage devices support significantly lower read/write latencies and higher bandwidth than backend storage arrays that a host system accesses over a network (e.g., Fibre channel, Ethernet, etc.). There are a number of reasons for this improved performance. First, backend storage arrays typically must service read/write requests from multiple host systems, and each backend storage array has finite queues that affect the amount of bandwidth/latency that the array can support for a particular host system. Second, storage networks may include active elements such as switches or routers that increase latencies between network endpoints (e.g., host systems and backend storage devices). Thus, host-side flash storage devices are better suited for caching/storing data that VMs running on the host system need to access frequently and rapidly. Unfortunately, existing virtualization platforms do not provide a mechanism for automatically allocating and surfacing (i.e., making accessible/visible) portions of a host-side flash storage device to VMs so that the VMs can take advantage of the device's low latency characteristics. Further, existing virtualization platforms cannot optimize allocations of surfaced flash storage capacity among VMs in response to changing conditions on the host system.

SUMMARY

Techniques for surfacing host-side flash storage capacity to a plurality of VMs running on a host system are provided. In one embodiment, the host system creates, for each VM in the plurality of VMs, a flash storage space allocation in a flash storage device that is locally attached to the host system. The host system then causes the flash storage space allocation to be readable and writable by the VM as a virtual flash memory device.

The following detailed description and accompanying drawings provide a better understanding of the nature and advantages of particular embodiments.

DETAILED DESCRIPTION

Figure 1:
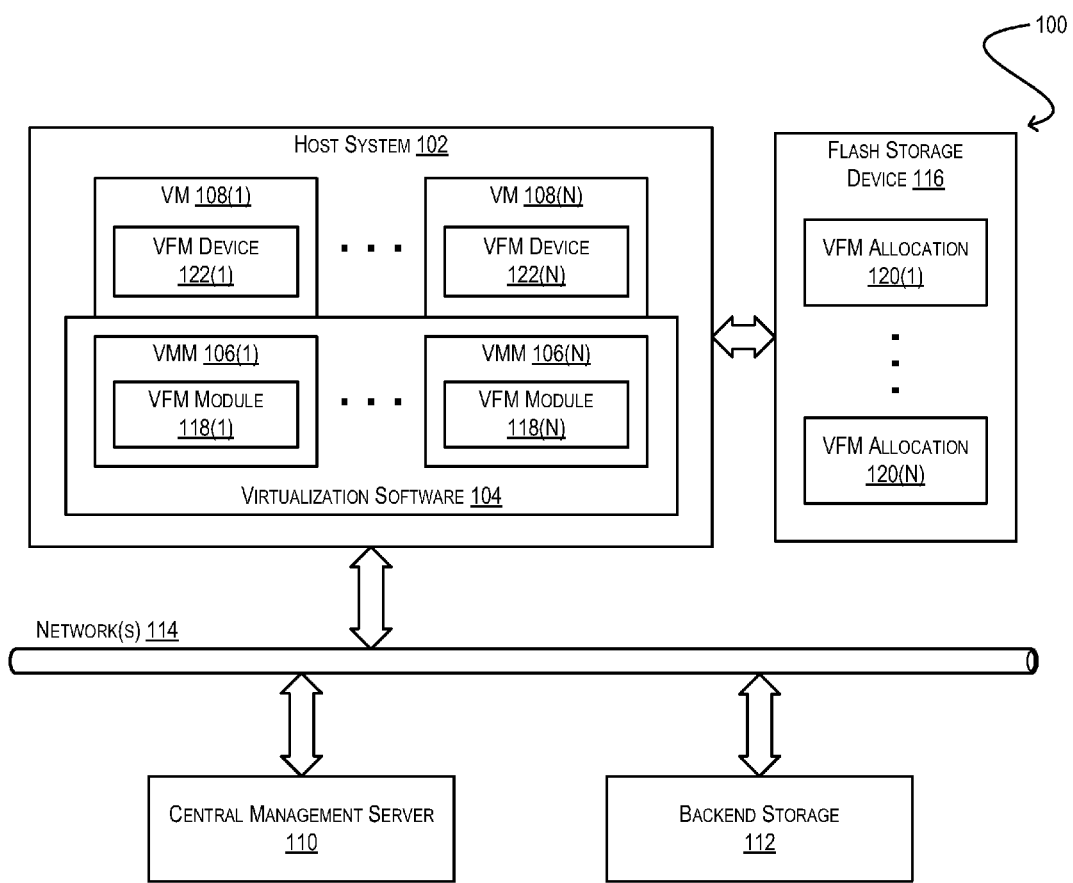
FIG. 1 depicts a block diagram of a system environment that supports the surfacing of host-side flash storage capacity to VMs as virtual flash memory devices according to one embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Particular embodiments provide techniques for surfacing host-side flash storage capacity to VMs as virtual flash memory (VFM) devices. In one embodiment, upon powering on a particular VM, a host system can automatically allocate space for the VM in a host-side flash storage device. The size of this flash storage space allocation can be based on, e.g., a parameter that a user/system administrator specifies at the time of VM provisioning. The host system can then surface, or make accessible, the flash storage space allocation as a VFM device to the VM, such that the VM can read from and write to the flash storage space allocation via the VFM device. Applications running in the VM can leverage the VFM device in various ways to take advantage of the low latency characteristics of the host-side flash storage device.

In certain embodiments, the host system can dynamically manage the host-side flash storage space that it allocates/surfaces to VMs so that inactive (e.g., suspended or powered off) VMs do not consume any space on the host-side flash storage device. For example, when a VM is suspended or powered off, the host system can free the flash storage space allocated to that VM, which the host system can re-allocate for use by other VMs. When the VM is subsequently resumed or powered on, the host system can allocate a new portion of the host-side flash storage device to the VM per the VM's requirements. In this manner, the host system can ensure that each VM only consumes host-side flash storage capacity when actually needed (i.e., when the VM is actively running), and thus can optimize the sharing of this capacity across multiple VMs.

In further embodiments, as part of the process of freeing and re-allocating the host-side flash storage space for a VM upon VM suspend/resume and VM power off/power on, the host system can treat the VFM device for the VM as a non-volatile memory device or a volatile memory device. In the former case, the host system can save the data stored in the VM's flash storage allocation to a backend storage device (e.g., a hard disk-based storage array) when the VM is either suspended or powered off. The host system can then restore the saved data to the VM's new flash storage allocation when the VM is resumed or powered on. With this approach, the VM has the illusion that the data in the VFM device is persistent across both VM suspend and VM power cycles (like any other typical storage device).

In the latter case, the host system can only save/restore the data in the VM's flash storage allocation to/from the backend storage device when the VM is suspended and resumed. The host system does not perform this save/restore process when the VM is powered off and on, which means that the data in the VM's flash storage allocation is lost during a VM power cycle. With this approach, the VM has the illusion that the VFM device corresponds to a tier of volatile memory (e.g., RAM). Since the VFM device is capable of acting as a volatile memory device (from a VM lifecycle perspective), it is referred to as a virtual flash "memory" device (rather than a virtual flash "storage" device). However, as described in further detail below, the VM can access the VFM device via a standard, block-based protocol (e.g., SCSI).

FIG. 1 depicts a system environment 100 that supports the surfacing of host-side flash storage capacity to VMs as VFM devices according to an embodiment. As shown, system environment 100 includes a host system 102 that executes virtualization software 104. Virtualization software 104 (also known as a "hypervisor") is a software layer that comprises a number of virtual machine monitors (VMMs) 106(1)-106(N). Each VMM 106(1)-106(N) provides a virtual hardware environment in which a corresponding VM 108(1)-108(N) can run.

In one embodiment, virtualization software 104 can interact directly with the physical hardware platform of host system 102 without an intervening host operating system. In this embodiment, virtualization software 104 can further comprise a kernel (not shown) that manages VMM access to the various physical hardware devices of host system 102. In an alternative embodiment, virtualization software 104 can be part of a "hosted" configuration in which virtualization software 104 runs on top of a host operating system (not shown). In this embodiment, virtualization software 104 can rely on the host operating system for resource management of physical hardware devices. One of ordinary skill in the art will recognize various modifications and alternatives for the design and configuration of virtualization software 104.

System environment 100 also includes a central management server (CMS) 110 and a backend storage component 112 that communicate with host system 102 via one or more networks 114. CMS 110 can perform various management tasks with respect to host system 102, such as VM lifecycle management, hardware monitoring, load balancing, and so on. Although only a single host system is shown in FIG. 1, it should be appreciated that CMS 110 can simultaneously manage a large number of host systems (each comprising multiple VMs), such as all of the host systems in a virtual infrastructure cluster. It should also be appreciated that CMS 110 can be federated to manage a large number of host systems that are scattered across different data centers (possibly in different geographic locations).

Backend storage component 112 is typically a hard-disk based storage array and can store virtual disk files (known as "VMDKs") and other persistent files that host system 102 and/or CMS 110 read from/write to during their runtime operation.

In the embodiment of FIG. 1, host system 102 is attached to a flash storage device 116. In one embodiment, flash storage device 116 can be a locally attached (i.e., host-side) device such as, e.g., an SSD, a PCIe flash card, a flash drive/appliance, or the like. In another embodiment, flash storage device 116 can be a network-attached device (via, e.g., a storage fabric/network). In yet another embodiment, flash storage device 116 can be a "host-shared" device, such that it is shared among multiple host systems. As noted in the Background section, it is desirable for VMs 108(1)-108(N) to have VM-aware access to flash storage device 116 so that applications running in VMs 108(1)-108(N) can take advantage of the device's low latency read/write capabilities.

To enable this functionality, VMMs 106(1)-106(N) can each include a VFM module 118(1)-118(N). As discussed in further detail below, each VFM module 118(1)-118(N) can, at the time of initially powering on a corresponding VM 108(1)-108(N), automatically allocate a portion of flash storage device 116 to the VM (shown as VFM allocations 120(1)-120(N)). In one embodiment, flash storage device 116 can be formatted with a logical volume manager or a flash friendly file system that enables the VFM module to create the VFM allocation as a file on device 116. The VFM module can then interoperate with its VMM to surface that allocated portion as a virtual flash memory, or VFM, device to the VM (shown as VFM devices 122(1)-122(N)). This allows applications running in the VM to view and interact with (e.g., read from and write to) flash storage device 116 via the surfaced VFM device.

In addition, each VFM module 118(1)-118(N) can, at the time of suspending, snapshotting, or powering off a corresponding VM 108(1)-108(N), free the VM's VFM allocation in flash storage device 116 so that it can be used for other purposes while the VM is inactive. When the VM is resumed or powered back on, the VFM module can re-allocate new space in flash storage device 116 for the VM per the VM's requirements. This gives the VM the impression that it has persistent access to its VFM device (when, in fact, it does not). In one embodiment, the VFM module can treat the VM's VFM device/VFM allocation as non-volatile memory, and thus backup the data stored in the VFM allocation to backend storage 112 upon VM suspend or VM power off. In an alternative embodiment, the VFM module can treat the VM's VFM device/VFM allocation as volatile memory, and thus allow the data stored in the VFM allocation to be discarded upon VM power off.

Figure 2:
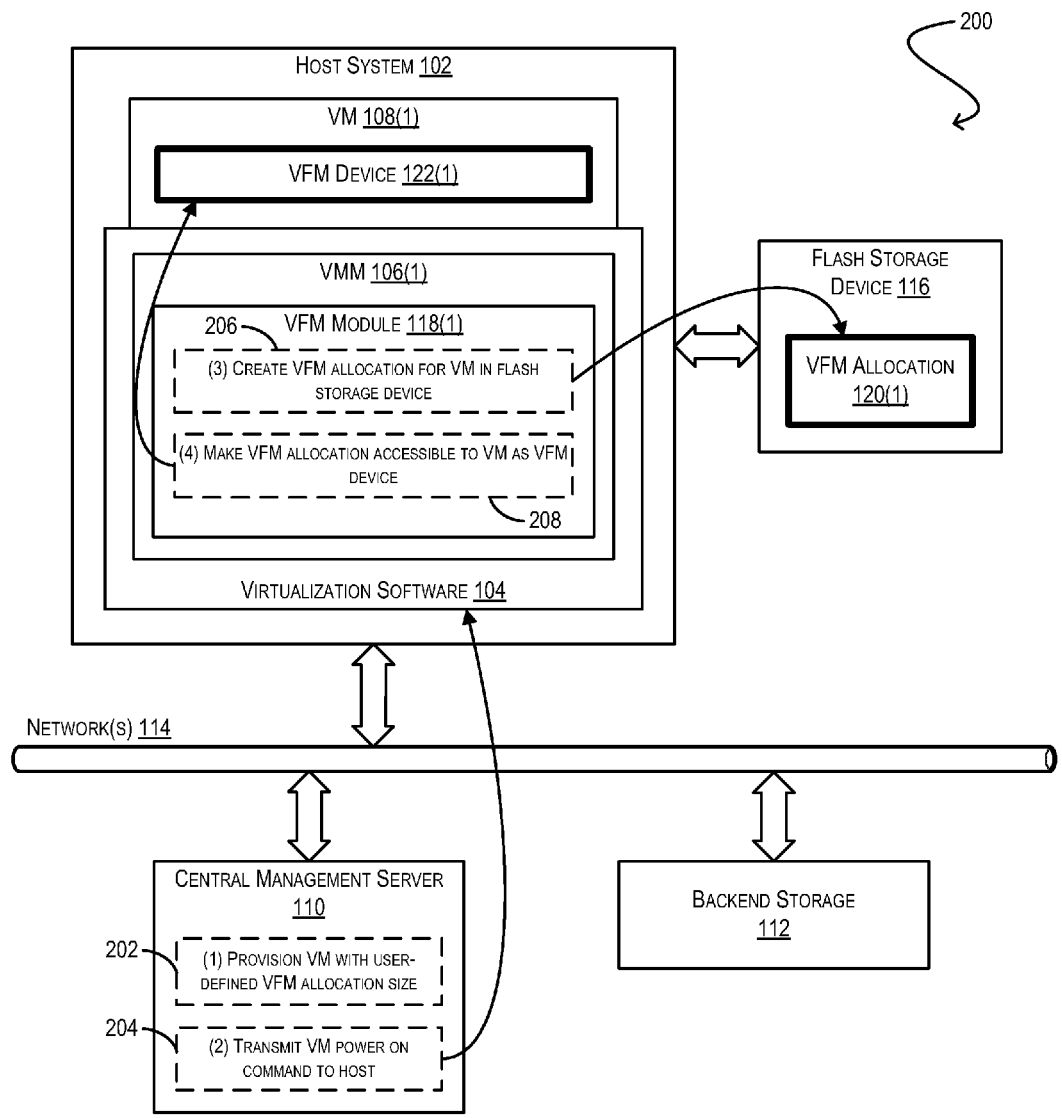
FIG. 2 depicts a flow within the system environment of FIG. 1 for surfacing host-side flash storage capacity to a VM at the time of provisioning and powering on the VM according to one embodiment.

FIG. 2 depicts a flow 200 within system environment 100 for surfacing a portion of flash storage device 116 to a VM at the time of provisioning and powering on the VM according to an embodiment. At step (1) of flow 200 (reference numeral 202), CMS 110 can provision a new VM (e.g., VM 108(1)) for deployment on host system 102. As part of this step, CMS 110 can receive from, e.g., a system administrator, a parameter indicated a desired VFM allocation size for VM 108(1). In one embodiment, CMS 110 can store this parameter, along with other VM configuration information, in an appropriate VM metadata file (e.g., a .VMX file).

At step (2) (reference numeral 204), CMS 110 can transmit a command to virtualization software 104 running on host system 102 to power on VM 108(1). In response, virtualization software 104 can cause VMM 106(1) to initiate a power on process for VM 108(1). As part of this power on process, VFM module 118(1) of VMM 106(1) can allocate a portion of flash storage device 116 for VM 108(1) in the form of VFM allocation 120(1) (step (3); reference numeral 206). VFM module 118(1) can determine the size of VFM allocation 120(1) based on, e.g., the user-defined VFM allocation size parameter received at step (1).

Once VFM module 118(1) has created VFM allocation 120(1), VFM module 118(1) can (in conjunction with VMM 106(1)) surface, or make accessible, VFM allocation 120(1) to VM 108(1) as a VFM device 122(1) (step (4); reference numeral 208). In other words, VFM module 118(1)/VMM 106(1) can cause VFM allocation 120(1) to be presented in VM 108(1) as VFM device 122(1), such that applications running in VM 108(1) can read from, and write to, VFM allocation 120(1) via VFM device 122(1). CMS 110 and host system 102 can then repeat the steps of flow 200 to provision and power on additional VMs 108(2)-108(N), each having a surfaced VFM device 122(2)-122(N) corresponding to a VFM allocation 120(2)-120(N) in flash storage device 116. In this way, host system 102 can automatically share the storage space of flash storage device 116 among VMs 108(1)-108(N) and make that space available within each VM.

Although not shown in FIG. 2, CMS 110 and host system 102 can carry out a flow that is similar to flow 200 for creating and surfacing VFM allocation 102(1) to VM 108(1) when VM 108(1) is already provisioned and powered on (this is referred to as a "hot plug" scenario). In the hot plug scenario, CMS 110 can transmit a VFM configuration command to virtualization software 104 while VM 108(1) is running. The VFM configuration command can include, e.g., a request to add a new VFM device to VM 108(1) (along with a user-defined allocation size). VFM module 118(1) can then create VFM allocation 120(1) based on the user-defined size and surface VFM allocation 120(1) to VFM 108(1) per steps (3) and (4) of flow 200. In certain embodiments, the VFM configuration command can also include a "delete" command for removing an existing VFM allocation for VM 108(1). In the case of either adding a new VM allocation or deleting an existing VFM allocation, CMS 110 can record the change in a metadata file for VM 108(1) (i.e., the .VMX file noted above) when the processing completes successfully.

Figure 3:
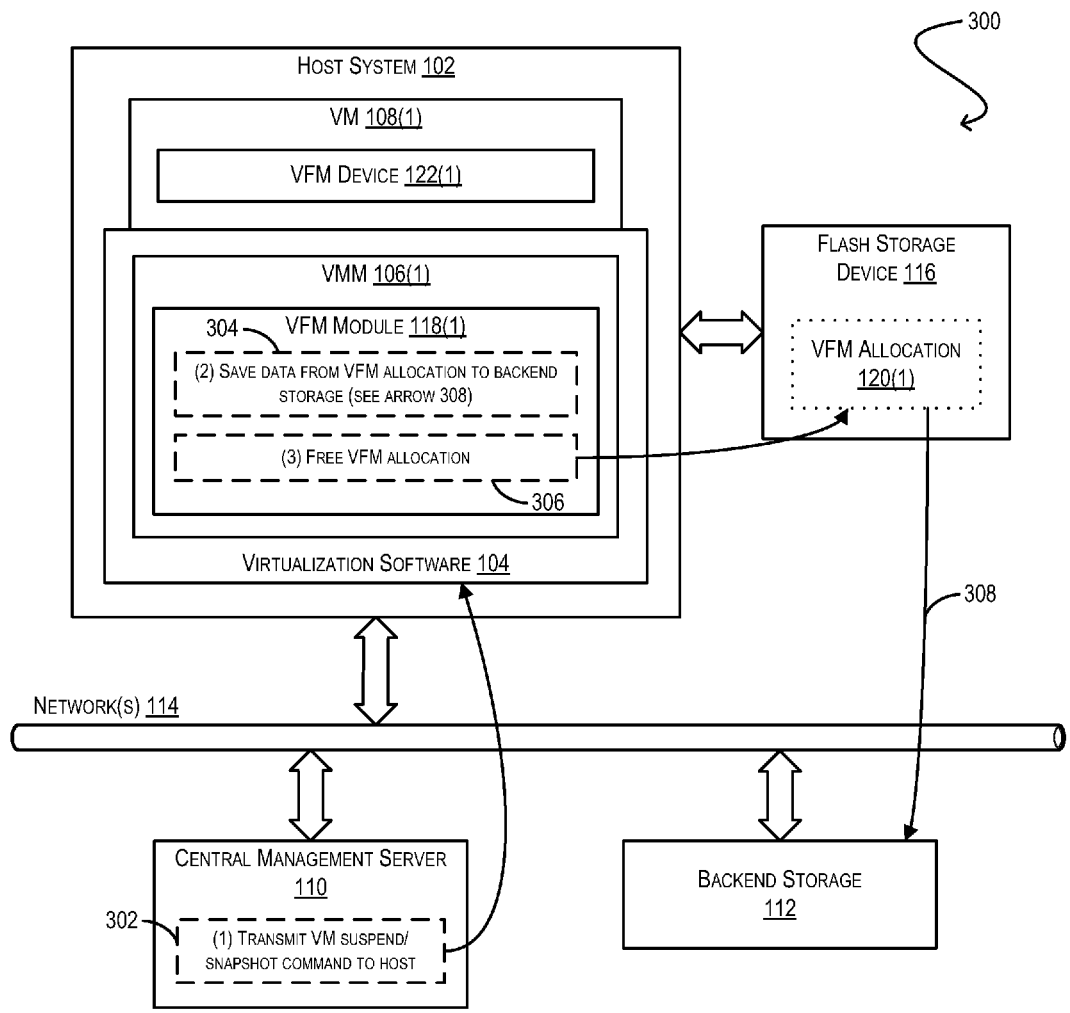
FIG. 3 depicts a flow within the system environment of FIG. 1 for freeing a host-side flash storage space allocation for a VM when the VM is suspended or snapshotted according to one embodiment.
Figure 4:
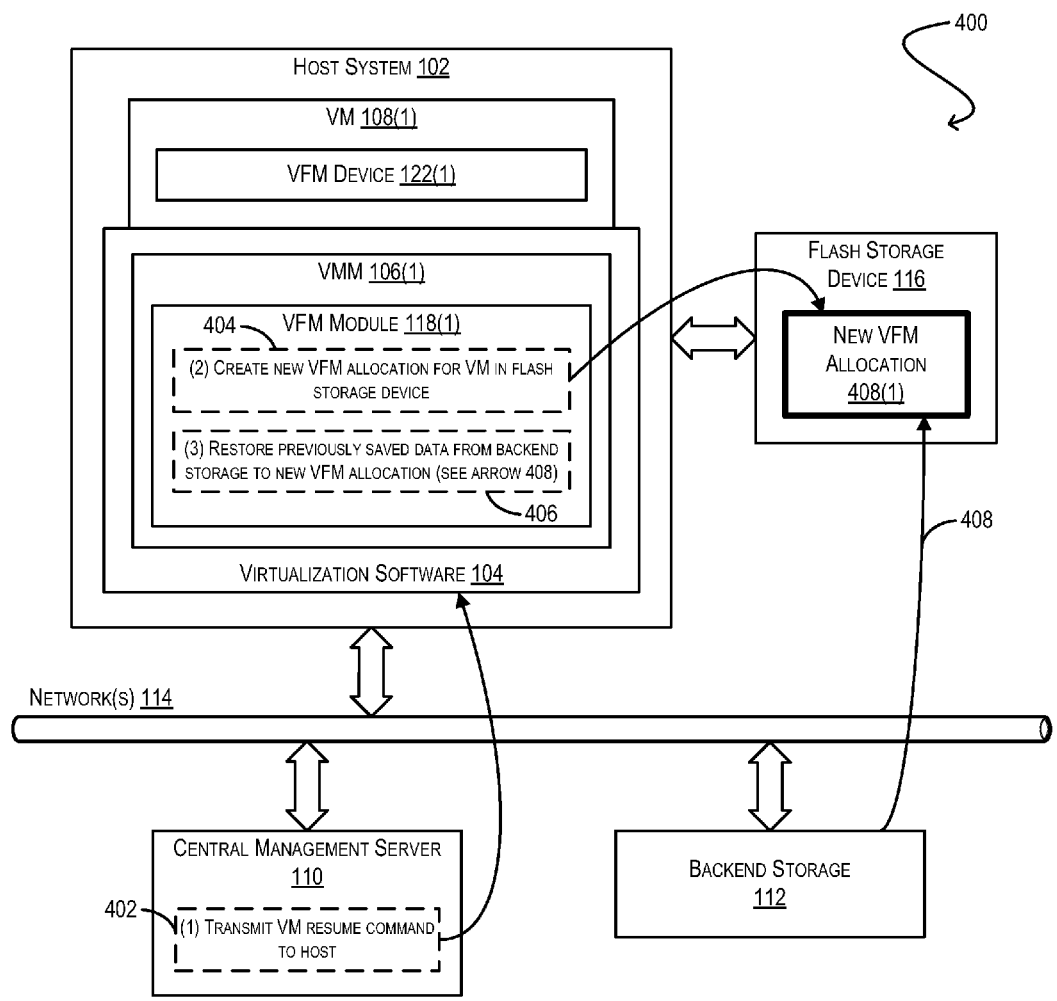
FIG. 4 depicts a flow within the system environment of FIG. 1 for allocating a new host-side flash storage space allocation for a VM when the VM is resumed according to one embodiment.

FIGS. 3 and 4 depict flows 300 and 400 respectively that can be performed after flow 200 of FIG. 2 for suspending/snapshotting VM 108(1) and subsequently resuming VM 108(1) according to an embodiment. At step (1) of flow 300 (reference numeral 302), CMS 110 can transmit a command to virtualization software 104 to suspend, or create a snapshot of, VM 108(1). In various embodiments, CMS 110 can transmit this command in response to, e.g., input from a system administrator or an automated process/agent.

Upon receiving the suspend/snapshot command, virtualization software 104 can cause VMM 106(1) to initiate a suspend/snapshot process for VM 108(1). As part of this suspend/snapshot process, VFM module 118(1) can save the data stored in VFM allocation 120(1) to backend storage 112 (step (2); reference numeral 304). This saving process is shown via arrow 308. VFM module 118(1) can then free VFM allocation 120(1), such that the flash storage capacity associated with VFM allocation 120(1) is made available for other purposes (step (3); reference numeral 306). As a result, VM 108(1) will not consume any storage space in flash storage device 116 while VM 108(1) remains in a suspended or snapshotted state.

Turning now to flow 400 of FIG. 4, at a later point in time, CMS 110 can transmit a command to virtualization software 104 to resume VM 108(1) (step (1) of flow 400; reference numeral 402)). Upon receiving the resume command, virtualization software 104 can cause VMM 106(1) to initiate a resume process for VM 108(1), which in turn causes VFM module 118(1) to create a new VFM allocation 408(1) for VM 108(1) in flash storage device 116 (step (2); reference numeral 404). To determine the size of new VFM allocation 408(1), VFM module 118(1) can refer to the same user-defined VFM allocation size parameter described at step (2) of flow 200.

Finally, at step (3) of flow 400 (reference numeral 404), VFM module 118(1) can restore, or transfer over, the VFM data previously saved to backend storage 112 to new VFM allocation 408(1), thereby essentially recreating the state of original VFM allocation 120(1) in flash storage device 116. This data transfer is shown via arrow 408. Once the VM resume process is complete, VM 108(1) can access new VFM allocation 408(1) (which contains all of the data previously stored in original VFM allocation 120(1)) via VFM device 122(1).

By freeing and re-creating the VFM allocation for VM 108(1) per flows 300 and 400, VFM module 118(1) can prevent VM 108(1) from unnecessarily tying up storage space in flash storage device 116 when the VM is not actively running (e.g., suspended or snapshotted). Thus, this approach can optimize the usage of flash storage device 116 across VMs 108(1)-108(N). Further, by saving and restoring the data stored in VFM allocation 120(1) to/from backend storage 112, VFM module 118(1) can ensure that this data is still available to VM 108(1) via VFM device 122(1) when VM 108(1) is resumed.

As noted previously, in certain embodiments, VFM module 118(1) can treat VFM device 122(1) of VM 108(1) as either a non-volatile memory device or a volatile memory device. The classification of VFM device 122(1) as a non-volatile memory device or a volatile memory device can depend on, e.g., a parameter that a system administrator defines at the time of provisioning VM 108(1). In the embodiment where VFM module 118(1) considers VFM device 122(1) to be a non-volatile memory device, VFM module 118(1) can carry out flows that are substantially similar to suspend/snapshot flow 300 and resume flow 400 when VM 108(1) is powered off and powered on respectively. For example, when VM 108(1) is powered off, VFM module 118(1) can save the data stored in VFM allocation 120(1) to backend storage 112 and subsequently free VFM allocation 120(1). When VM 108(1) is powered back on, VFM module 118(1) can create a new VFM allocation for VM 108(1) in flash storage device 116 and restore the previously saved data to the new VFM allocation. This creates the illusion that VFM device 122(1) is a physical, non-volatile memory device since, from the perspective of VM 108(1), the data stored in VFM device 122(1) persists across the VM power cycle.

In the embodiment where VFM module 118(1) considers VFM device 122(1) to be a volatile memory device, VFM module 118(1) can simply free VFM allocation 120(1) upon VM power off and create a new VFM allocation for VM 108(1) in flash storage device 116 upon VM power on, without backing up the data in VFM allocation 120(1) to backend storage 112. This creates the illusion that VFM device 122(1) is a physical, volatile memory device since, from the perspective of VM 108(1), the data stored in VFM device 122(1) is lost across the VM power cycle.

Figure 5:
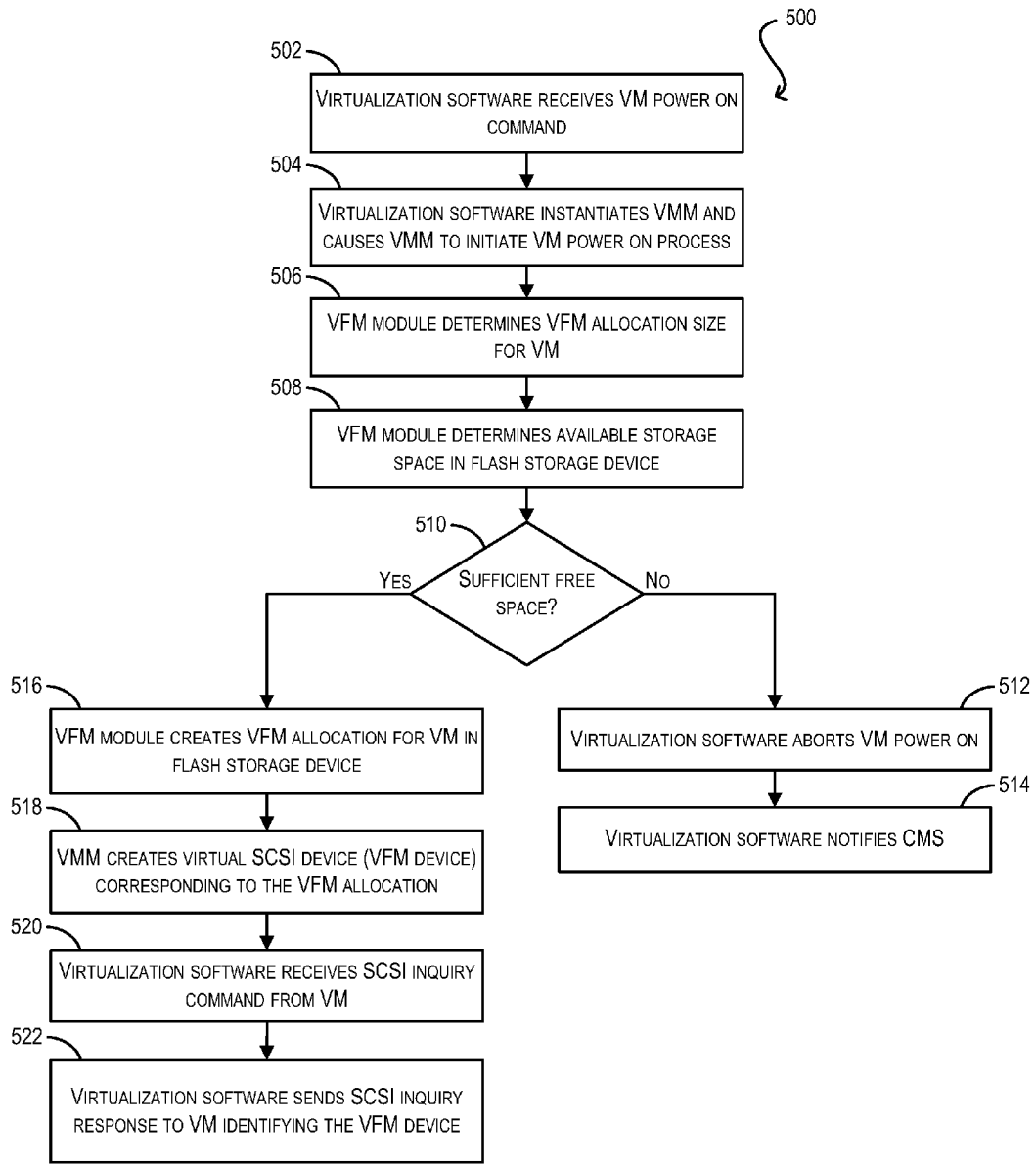
FIG. 5 depicts a flowchart that provides additional details regarding the flow of FIG. 2 according to one embodiment.

FIG. 5 depicts a flowchart 500 that provides a more detailed description of the processing attributed to host system 102 in the VM power on flow of FIG. 2 according to an embodiment. At block 502, virtualization software 104 can receive, from CMS 110, a command to power on a VM (e.g., VM 108(1)). In response, virtualization software 104 can instantiate a VMM (e.g., VMM 106(1)) and cause the VMM to initiate the power on process for VM 108(1) (block 504).

At block 506, the VFM module included in VMM 106(1) (e.g., VFM module 118(1)) can determine a VFM allocation size for VM 108(1). For example, VFM module 118(1) can determine this information from the .VMX file that CMS 110 creates at the time of VM provisioning (as previously described with respect to FIG. 2). VFM module 118(1) can also determine the amount of available storage space in flash storage device 116 (block 508).

At block 510, VFM module 118(1) can check whether flash storage device 116 has sufficient free space to accommodate the VFM allocation size determined at block 506. If flash storage device 116 does not have sufficient free space, VFM module 118(1) can inform virtualization software 104, which can abort the VM power on process (block 512). In one embodiment, the decision to abort the VM power on process at this stage can be a policy decision that is controlled at per VM granularity. Virtualization software 104 can also notify CMS 110 that VM 108(1) cannot be powered on (block 514). CMS 110 may then attempt to deploy VM 108(1) on a different host system.

On the other hand, if flash storage device 116 does have sufficient free space, VFM module 118(1) can create, in flash storage device 116, a VFM allocation having the size determined at block 506 (e.g., VFM allocation 120(1)) (block 516). In a particular embodiment, the created VFM allocation can correspond to a virtual disk file. In another embodiment, the created VFM allocation can be a block device that is carved out by a logical volume manager.

Once VFM module 118(1) has created VFM allocation 120(1), VFM module 118(1)/VMM 106(1)/virtualization software 104 can take steps to surface VFM allocation 120(1) to VM 108(1) as a VFM device. In certain embodiments, VFM allocation 20(1) can be surfaced as a block-based device (e.g., a virtual SCSI device). For example, at block 518, VFM module 118(1) can pass a handle for VFM allocation 120(1) to VMM 106(1), which can create a virtual SCSI device (e.g., VFM device 122(1)) corresponding to VFM allocation 120(1). At block 520, virtualization software 104 can receive a SCSI inquiry command from VM 108(1) as part of the VM's boot-up procedure. Finally, at block 522, virtualization software 104 can send a SCSI inquiry response to VM 108(1) that identifies VFM device 122(1). In one embodiment, the SCSI inquiry response can include information that indicates to VM 108(1) that VFM device 122(1) is a flash-based device. In a further embodiment, the SCSI inquiry response can include information that indicates to VM 108(1) that VFM device 122(1) is configured to behave (from a VM lifecycle perspective) as either a non-volatile memory device or a volatile memory device.

Figure 6:
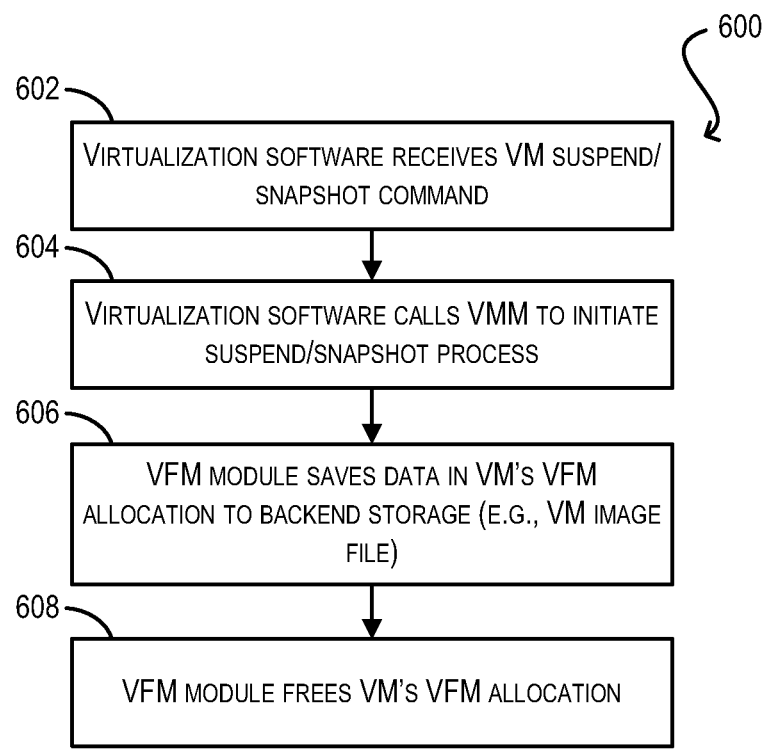
FIG. 6 depicts a flowchart that provides additional details regarding the flow of FIG. 3 according to one embodiment.
Figure 7:
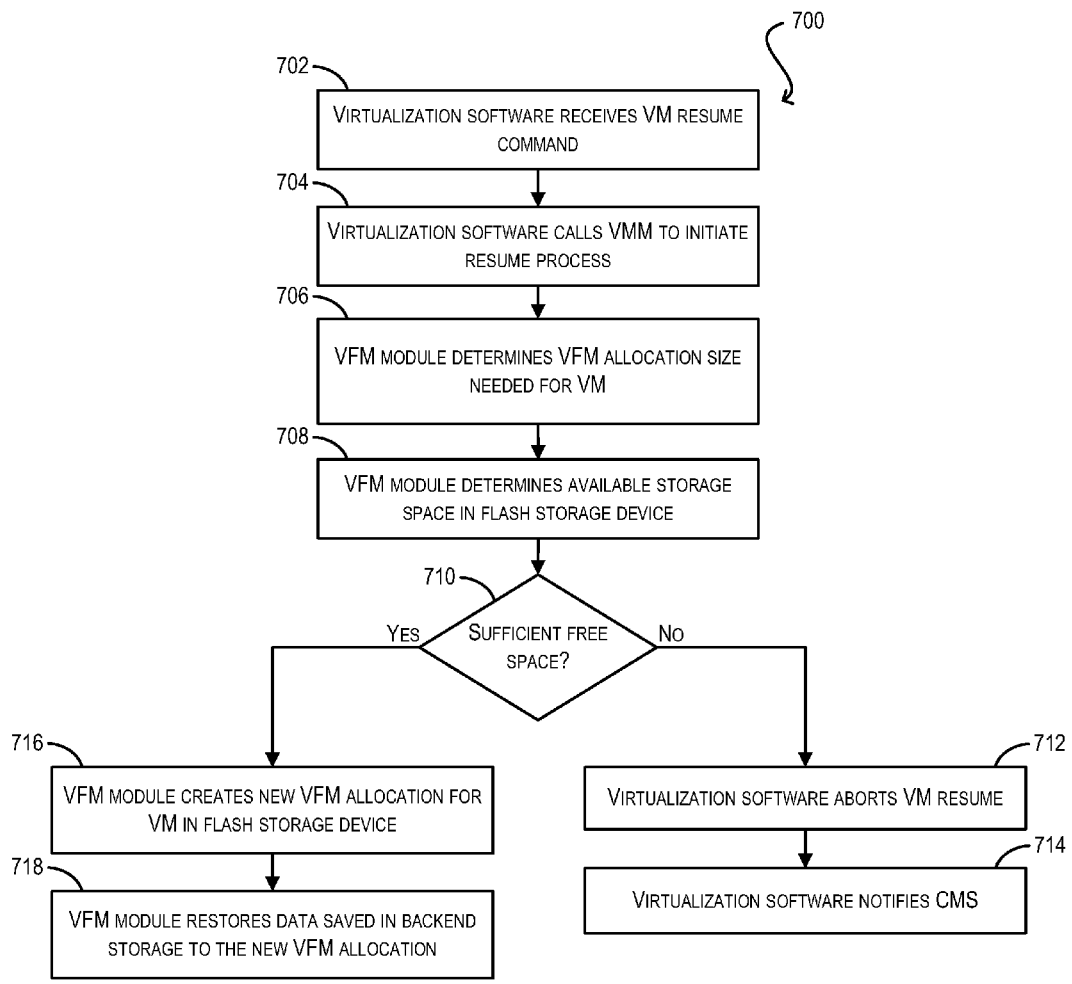
FIG. 7 depicts a flowchart that provides additional details regarding the flow of FIG. 4 according to one embodiment.

FIGS. 6 and 7 depict flowcharts 600 and 700 respectively that provide a more detailed description of the processing attributed to host system 102 in the VM suspend/snapshot and VM resume flows of FIGS. 3 and 4 according to an embodiment. At block 602, virtualization software 104 can receive, from CMS 110, a command to suspend, or create a snapshot of, VM 108(1). In response, virtualization software 104 can call VMM 106(1) to initiate the VM suspend/snapshot process for VM 108(1) (block 604).

As part of the suspend/snapshot process, VFM module 118(1) of VMM 106(1) can save the data stored in VFM allocation 120(1) to backend storage 112. In certain embodiments, VFM module 118(1) can save the data to a VM image file for VM 108(1) that is resident on backend storage 112 (block 606). The VM image file can include, among other things, the RAM state of VM 108(1). In other embodiments, VFM module 118(1) can save the data to an alternative location, such as in one of the virtual disks of VM 108(1).

VFM module 118(1) can then free VFM allocation 120(1) (block 608). This step can include deleting the file corresponding to VFM allocation 120(1), or otherwise reclaiming the storage space associated with VFM allocation 120(1) in flash storage device 116 so that the space can be used again.

Turning now to FIG. 7, at block 702, virtualization software 104 can receive, from CMS 110, a command to resume operation of suspended VM 108(1). In response, virtualization software 104 can call VMM 106(1) to initiate the VM resume process for VM 108(1) (block 704).

At blocks 706-710, VFM module 118(1) of VMM 106(1) can carry out steps to determine whether flash storage device 116 had sufficient free space to accommodate a new VFM allocation for VM 108(1). In various embodiments, blocks 706-710 can be substantially similar to blocks 506-510 of FIG. 5. If flash storage device 116 does not have sufficient free space, virtualization software 104 can abort the resume process and notify CMS 110 that VM 108(1) cannot be resumed (blocks 712 and 714). CMS 110 may then attempt to migrate VM 108(1) to a different host system with sufficient flash storage space.

If flash storage device 116 does have sufficient free space, VFM module 118(1) can create, in flash storage device 116, a new VFM allocation having substantially the same size as original VFM allocation 120(1) (e.g., VFM allocation 408(1)) (block 716). As part of this step, VFM module 118(1) can associate new VFM allocation 408(1) with previously surfaced VFM device 122(1). VFM module 118(1) can then restore the data saved in backend storage 112 (per block 606 of FIG. 6) to new VFM allocation 408(1) (block 718), which allows VM 108(1) to access the data via VFM device 122(1) upon completion of the resume process.

Figure 8:
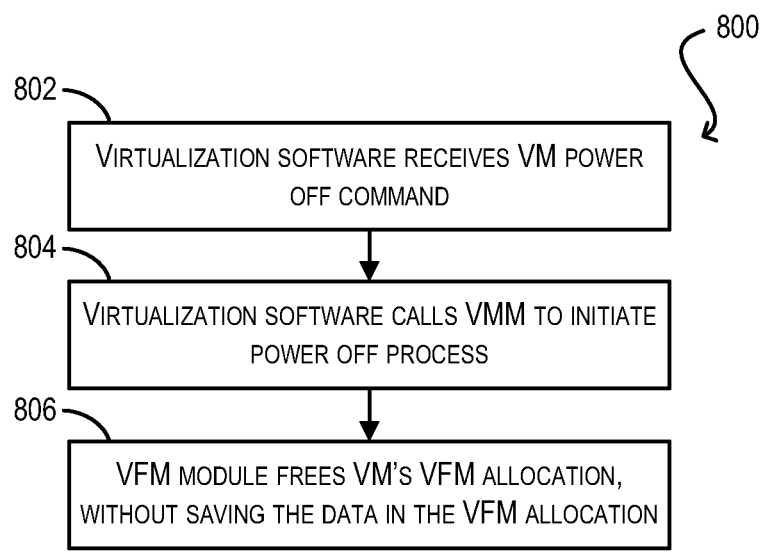
FIG. 8 depicts a flowchart of a process for freeing a host-side flash storage space allocation for a VM when the VM is powered off according to one embodiment.

FIG. 8 depicts a flowchart 800 for powering off VM 108(1) when VFM device 122(1) of VFM 108(1) is configured to act as a volatile memory device (rather than a non-volatile memory device) according to an embodiment. As noted previously, this scenario requires different processing than the VM suspend flow shown in FIGS. 3 and 6, since the data stored in VFM device 122(1) should not persist across a VM power cycle.

At block 802, virtualization software 104 can receive, from CMS 110, a command to power off VM 108(1). As used herein, the phrases "powering off a VM" and "VM power off" refer to causing the guest operating system running within the VM to shut down.

At block 804, virtualization software 104 can call VMM 106(1) to initiate the VM power off process for VM 108(1). As part of this power off process, VFM module 118(1) can free VFM allocation 120(1) in a manner that is substantially similar to block 608 of FIG. 6 (block 806). However, unlike FIG. 6, at block 806 VFM module 118(1) specifically refrains from saving the data stored in VFM allocation 120(1) to backend storage 112 prior to freeing VFM allocation 120(1). This prevents the data from being available to VM 108(1) when it is powered back on, and thus preserves the volatile memory semantics of VFM device 122(1).

Figure 9:
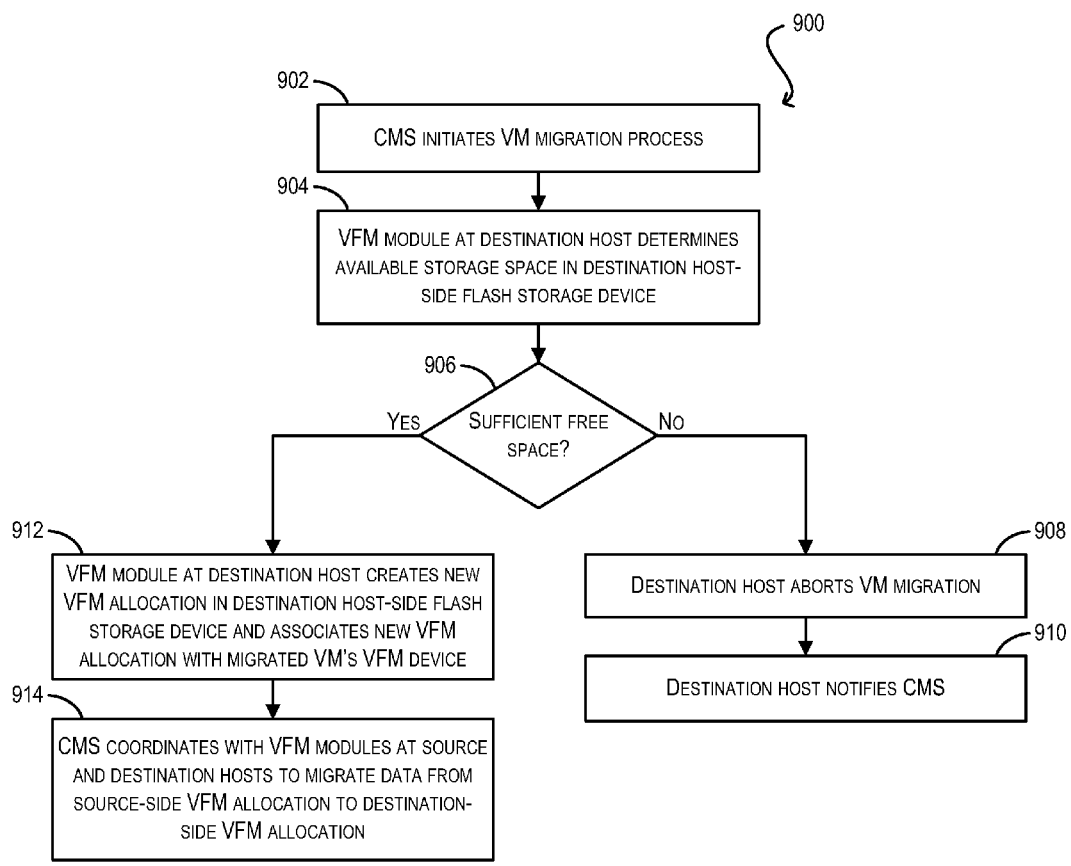
FIG. 9 depicts a flowchart of a process for migrating a host-side flash storage space allocation for a VM when the VM is moved from one host system to another host system according to one embodiment.

In some embodiments, CMS 110 can migrate, or move, a VM that has a surfaced VFM device from one host system (i.e., a "source" host system) to another host system (i.e., a "destination" host system). In these embodiments, the VFM modules resident on both the source and destination host systems can interoperate to ensure that the data associated with the VFM device is correctly migrated from the source host-side flash storage device to the destination host-side flash storage device. FIG. 9 depicts a flowchart 900 of such a migration process.

At block 902, CMS 110 can initiate a migration of a VM from a source host system to a destination host system. In one embodiment, CMS 110 can initiate this migration process as a "live" process (i.e., while the VM is still running) using a technology such as vMotion developed by VMware, Inc.

At block 904, the VFM module for the VM at the destination host system can determine the amount of available space in the destination host-side flash storage device. The destination VFM module can then determine whether the amount of available space is sufficient to accommodate the entire contents of the VFM allocation for the VM on the source host side (block 906). If there is insufficient free space, the virtualization software on the destination host system can abort the VM migration process and notify CMS 110 (blocks 908 and 910).

On the other hand, if there is sufficient free space in the destination host-side flash storage device, the destination VFM module can create a new VFM allocation in the destination host-side flash storage device and associate the new VFM allocation with the migrated VM's VFM device (block 912). CMS 110 can then coordinate with the VFM modules at both the source and destination host systems to copy over the data from the source-side VFM allocation to the newly created destination-side VFM allocation (block 914). At the conclusion of this process, the migrated VM can access, via its VFM device, the same VFM data that it was able to access prior to the migration, since the destination-side VFM allocation contains the same data as the source-side VFM allocation. In certain embodiments, the source-side VFM module can free the source-side VFM allocation once the migration is complete, which allows that source host-side flash storage capacity to be reused.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Disc) (e.g., CD-ROM, CD-R, or CD-RW), a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for surfacing host-side flash storage capacity to a plurality of virtual machines (VMs) configured to run on a host system, the method comprising:
    creating, by the host system for each VM in the plurality of VMs, a flash storage space allocation in a flash storage device that is locally attached to the host system;
    causing, by the host system, the flash storage space allocation to be readable and writable by the VM as a virtual flash memory device, the causing comprising:
        creating a virtual Small Computer System Interface (SCSI) device corresponding to the flash storage space allocation;
        receiving, from the VM upon initialization, an inquiry command; and
        in response to the inquiry command, sending an inquiry response to the VM, wherein the inquiry response identifies the virtual SCSI device as being a flash-based device that is readable and writable by the VM, and wherein the inquiry response includes information indicating whether the virtual SCSI device is configured to behave as a nonvolatile memory device or as a volatile memory device; and freeing, by the host system, the flash storage space allocation for the VM when the VM is suspended or powered off.

2. The method of claim 1 further comprising:
creating, for the VM, a new flash storage space allocation in the flash storage device when the VM is resumed or powered back on.

3. The method of claim 2 wherein freeing the flash storage space allocation for the VM when the VM is suspended comprises:
saving data stored in the flash storage space allocation to a backend storage device; and
freeing the flash storage space allocation after the saving.

4. The method of claim 3 where the data is saved to a VM image file resident on the backend storage device.

5. The method of claim 3 wherein creating, for the VM, the new flash storage space allocation in the flash storage device when the VM is resumed comprises:
restoring the data previously saved to the backend storage device to the new flash storage space allocation.

6. The method of claim 1 wherein freeing the flash storage space allocation for the VM when the VM is powered off comprises, if the information included in the inquiry response indicates that the virtual SCSI device is configured to behave as a volatile memory device:
freeing the flash storage space allocation without saving data stored in the flash storage space allocation to a backend storage device.

7. The method of claim 1 further comprising:
freeing the flash storage space allocation for the VM when the VM is migrated to another host system.

8. The method of claim 7 further comprising, prior to freeing the flash storage space allocation when the VM is migrated to said another host system:
copying data stored in the flash storage space allocation to a new flash storage allocation that is resident on a flash storage device locally attached to the another host system.

9. The method of claim 1 wherein the size of the flash storage space allocation for the VM is defined by a user at a time of provisioning the VM.

10. The method of claim 1 wherein the flash storage space allocation for the VM corresponds to a file resident on the flash storage device.

11. A non-transitory computer readable storage medium having stored thereon computer software executable by a processor, the computer software embodying a method for surfacing host-side flash storage capacity to a plurality of VMs configured to run on a host system, the method comprising:
creating, for each VM in the plurality of VMs, a flash storage space allocation in a flash storage device that is locally attached to the host system;
causing the flash storage space allocation to be readable and writable by the VM as a virtual flash memory device, the causing comprising:
creating a virtual Small Computer System Interface (SCSI) device corresponding to the flash storage space allocation;
receiving, from the VM upon initialization, an inquiry command; and
in response to the inquiry command, sending an inquiry response to the VM, wherein the inquiry response identifies the virtual SCSI device as being a flash-based device that is readable and writable by the VM, and wherein the inquiry response includes information indicating whether the virtual SCSI device is configured to behave as a nonvolatile memory device or as a volatile memory device; and
freeing the flash storage space allocation for the VM when the VM is suspended or powered off.

12. The non-transitory computer readable storage medium of claim 11 wherein the method further comprises:
creating, for the VM, a new flash storage space allocation in the flash storage device when the VM is resumed or powered back on.

13. The non-transitory computer readable storage medium of claim 12 wherein freeing the flash storage space allocation for the VM when the VM is suspended comprises saving data stored in the flash storage space allocation to a backend storage device, and
wherein creating, for the VM, the new flash storage space allocation in the flash storage device when the VM is resumed comprises restoring the data saved to the backend storage device to the new flash storage space allocation.

14. The non-transitory computer readable storage medium of claim 11 wherein freeing the flash storage space allocation for the VM when the VM is powered off comprises, if the information included in the inquiry response indicates that the virtual SCSI device is configured to behave as a volatile memory device, freeing the flash storage space allocation without saving the data stored in the flash storage space allocation to a backend storage device.

15. A host system comprising:
a locally attached flash storage device; and
a processor configured to:
create, for each VM in a plurality of VMs, a flash storage space allocation in the flash storage device;
cause the flash storage space allocation to be readable and writable by the VM as a virtual flash memory device, the causing comprising:
creating a virtual Small Computer System Interface (SCSI) device corresponding to the flash storage space allocation;
receiving, from the VM upon initialization, an inquiry command; and
in response to the inquiry command, sending an inquiry response to the VM, wherein the inquiry response identifies the virtual SCSI device as being a flash-based device that is readable and writable by the VM, and wherein the inquiry response includes information indicating whether the virtual SCSI device is configured to behave as a nonvolatile memory device or as a volatile memory device; and
free the flash storage space allocation for the VM when the VM is suspended or powered off.

16. The host system of claim 15 wherein the processor is further configured to
create, for the VM, a new flash storage space allocation in the flash storage device when the VM is resumed or powered back on.

17. The host system of claim 16 wherein freeing the flash storage space allocation for the VM when the VM is suspended comprises saving data stored in the flash storage space allocation to a backend storage device, and
wherein creating, for the VM, the new flash storage space allocation in the flash storage device when the VM is resumed comprises restoring the data saved to the backend storage device to the new flash storage space allocation.

18. The host system of claim 16 wherein freeing the flash storage space allocation for the VM when the VM is powered off comprises, if the information included in the inquiry response indicates that the virtual SCSI device is configured to behave as a volatile memory device, freeing the flash storage space allocation without saving the data stored in the flash storage space allocation to a backend storage device.

* * * * *